United States Patent [19]

Nathan et al.

[11] Patent Number: 4,725,369

[45] Date of Patent: Feb. 16, 1988

[54] PROCESS FOR THE PREPARATION OF SUBSTANTIALLY CRYSTALLINE CALCIUM SODIUM METAPHOSPHATE

[75] Inventors: Vaidy R. Nathan, St. Louis; John R. Jany, Ellisville; James E. Downes, St. Louis, all of Mo.

[73] Assignee: Monsanto Company, St. Louis, Mo.

[21] Appl. No.: 924,673

[22] Filed: Nov. 5, 1986

Related U.S. Application Data

[63] Continuation-in-part of Ser. No. 812,044, Dec. 23, 1985, abandoned.

[51] Int. Cl.$^4$ ............................................. C01B 25/30
[52] U.S. Cl. ........................................ 252/1; 423/306
[58] Field of Search ...................... 423/306, 314; 252/1

[56] References Cited

FOREIGN PATENT DOCUMENTS 1122610  11/1984  U.S.S.R. ............................. 423/314

*Primary Examiner*—John Doll
*Assistant Examiner*—Wayne A. Langel
*Attorney, Agent, or Firm*—Wendell W. Brooks; Arthur E. Hoffman; Arnold H. Cole

[57] ABSTRACT

Substantially crystalline calcium sodium metaphosphate having a degree of crystallinity from about 60% to about 75% as determined from density and differential thermal analysis measurements is prepared by (a) bringing together in water source materials for CaO, Na$_2$O, and P$_2$O$_5$ in proportions sufficient to provide a CaO/Na$_2$O/P$_2$O$_5$ mol percent ratio on a dry basis of about 29.0–34.0/16.0–18.0/50.0–53.0 and form a wet mix slurry containing a solid phase and an aqueous liquid phase and (b) heating the wet mix slurry at a temperature and for a time sufficient to remove the aqueous liquid phase and calcine the resulting solid phase to form the substantially crystalline calcium sodium metaphosphate.

14 Claims, No Drawings

PROCESS FOR THE PREPARATION OF SUBSTANTIALLY CRYSTALLINE CALCIUM SODIUM METAPHOSPHATE

CROSS-REFERENCE TO RELATED APPLICATIONS

This application is a continuation-in-part of copending application Ser. No. 812,044, filed Dec. 23, 1985, now abandoned.

BACKGROUND OF THE INVENTION

1. Field of the Invention

This invention relates to a process for the preparation of substantially crystalline calcium sodium metaphosphate. More particularly, this invention relates to a wet mix slurry process for the preparation of substantially crystalline calcium sodium metaphosphate. Such substantially crystalline calcium sodium metaphosphate is useful to prepare asbestiform crystalline calcium sodium metaphosphate fibers which are characterized by having the form or appearance of asbestos (principally chrysotile) and by exhibiting an aspect ratio of at least 10, preferably at least 50, and an average in diameter from about 0.5 micron ($\mu$m) to about 20 $\mu$m.

2. Discussion of the Prior Art

Calcium sodium metaphosphate having the formula $CaNa(PO_3)_3$ is known primarily identified as the completely crystalline form. In Russian Patent No. 1,122,610, a method is described for the preparation of crystalline calcium sodium metaphosphate (referred to therein as sodium-calcium metaphosphate). The process consists of interacting phosphoric acid at a concentration of 30–56% $P_2O_5$ in an amount sufficient to provide a 5–15% excess over the stoichiometrically required amount first with a calcium compound, followed by a sodium compound. The resulting reaction mixture is heated at a temperature from 350°–500° C. However, it generally has not been feasible to employ such a procedure to prepare substantially crystalline calcium sodium metaphosphate containing up to about 40% amorphous calcium sodium metaphosphate. One reason for this difficulty stems from the fact that the Russian procedure employs a two-step neutralization or reaction scheme, one to neutralize or react with the calcium compound and the other to neutralize or react with the sodium compound.

The procedural requirements associated with the employment of a two-step neutralization or reaction scheme, of necessity, are time-consuming and inconvenient. Accordingly, any economically feasible method which substantially reduces the time and number of steps involved in the reaction scheme, while at the same time affording an excellent yield of product, would be a decided advance in the calcium sodium metaphosphate art.

SUMMARY OF THE INVENTION

It is an object of this invention to provide a process for the preparation of substantially crystalline calcium sodium metaphosphate.

To achieve this and other objects, together with the advantages thereof, which will become apparent from the accompanying description and claims, a process is provided for the preparation of substanially crystalline calcium sodium metaphosphate having a degree of crystallinity from about 60% to about 75%, as determined from density and differential thermal analysis measurements, which process comprises:

(a) bringing together in aqueous media source materials for CaO, $Na_2O$, and $P_2O_5$ in proportions sufficient to provide a $CaO/Na_2O/P_2O_5$ mol percent ratio on a dry basis of about 29.0–34.0/16.0–18.0/50.0–53.0 and form a wet mix slurry containing a solid phase and an aqueous liquid phase, and (b) heating the wet mix slurry at a temperature and for a time sufficient to remove the aqueous liquid phase and calcine the resulting solid phase to form the substantially crystalline calcium sodium metaphosphate.

DESCRIPTION OF THE PREFERRED EMBODIMENTS

In accordance with this invention, a process is provided for the preparation of substantially crystalline calcium sodium metaphosphate which is useful to prepare asbestiform crystalline calcium sodium metaphosphate fibers. The substantially crystalline calcium sodium metaphosphate is prepared by a process which comprises:

(a) bringing together in aqueous media source materials for CaO, $Na_2O$, and $P_2O_5$ in proportions sufficient to provide a $CaO/Na_2O/P_2O_5$ mol percent ratio on a dry basis of about 29.0–34.0/16.0–18.0/50.0–53.0 and form a wet mix slurry containing a solid phase and an aqueous liquid phase, and (b) heating the wet mix slurry at a temperature and for a time sufficient to remove the aqueous liquid phase and calcine the resulting solid phase to form the substantially crystalline calcium sodium metaphosphate.

The term "substantially crystalline" is employed herein to describe calcium sodium metaphosphate having a degree of crystallinity (DC) between about 60% and about 75%. The degree of crystallinity may be calculated from density measurements by Equation (1)

$$DC = [(d_{sc} - d_{Oc})/d_{100c} - d_{Oc})] \times 100 \tag{1}$$

wherein:
$d_{sc}$ is the density of the substantially crystalline calcium sodium metaphosphate at 23° C.,
$d_{Oc}$ is the density of a morphous (DC=0%) calcium sodium metaphosphate; and
$d_{100c}$ is the density of crystalline (DC=100%) calcium sodium metaphosphate at 23° C. The value of $d_{100c}$ may be calculated from the crystal type and crystal lattice parameters obtained from wide angle X-ray diffraction measurements. The value of $d_{Oc}$ may be obtained via density measurements on samples exhibiting no apparent degree of crystallinity by X-ray diffraction or differential scanning calorimetric measurements.

Alternatively, DC may be calculated from the differential thermal analysis (DTA) peak area of a substantially crystalline calcium sodium metaphosphaate sample at 749° C., the melting point of crystalline calcium sodium metaphosphate, relative to that of a crystalline (DC=100%) calcium sodium metaphosphate sample as a reference material by Equation (2)

$$DC = [(pa_{sc}/m_{sc})/(pa_{100c}/m_{100c})] \times 100 \tag{2}$$

wherein:
pa$_{sc}$ is the DTA peak area of the substantially crystalline calcium sodium metaphosphate sample at 749° C., the melting point of calcium sodium metaphosphate;
m$_{sc}$ is the mass or weight of the substantially crystalline calcium sodium metaphosphate sample;
pa$_{100c}$ is the DTA peak area of the crystalline (DC=100%) calcium sodium metaphosphate reference sample; and
m$_{100c}$ is the mass or weight of the crystalline calcium sodium metaphosphate sample.

The substantially crystalline calcium sodium metaphosphate prepared in accordance with the instant process preferably is that which is readily convertible into asbestiform crystalline calcium sodium metaphosphate fibers. Referring to the substantially crystalline calcium sodium metaphosphate in terms of its dry basis calcium oxide (CaO)/sodium oxide (Na$_2$O)/phosphorous pentoxide (P$_2$O$_5$) composition equivalent, a mol percent ratio from about 29.0 to about 34.0 CaO, from about 16.0 to about 18.0 Na$_2$O, and from about 50.0 to about 53.0 P$_2$O$_5$, that is, a CaO/Na$_2$O/P$_2$O$_5$ mol percent ratio of about 29.0–34.0/16.0–18.0/50.0–53.0, has been found to consistently provide a superior product for the contemplated end-use applications. It is preferred to provide a substantially crystalline calcium sodium metaphosphate having the composition on a dry basis equivalent to a CaO/Na$_2$O/P$_2$O$_5$ mol percent ratio of about 31.4–31.8/17.1–17.3/51.1–51.3, with a CaO/Na$_2$O/P$_2$O$_5$ mol percent ratio of about 31.6/17.2/–51.2 being most preferred.

The substantially crystalline calcium sodium metaphosphate can be prepared from any number of component source materials known to those skilled in the art so long as the stated CaO/Na$_2$O/P$_2$O$_5$ mol percent ratio is achieved. It is preferred, by virtue of the elemental composition of the substantially crystalline calcium sodium metaphosphate to minimize the presence of anions other than carbonates, hydroxides, and phosphates, since the presence of more than trace amounts of anions such as sulfates, halides, and the like tends to exert an adverse effect upon the desired product. For convenience, the component source materials will be referred to herein as source materials for CaO, Na$_2$O, and P$_2$O$_5$.

Suitable source materials for CaO include calcium phosphates and basic calcium-containing materials such as calcium carbonate, calcium oxide, calcium hydroxide, and mixtures thereof. Calcium hydroxide [Ca(OH)$_2$] also known as hydrated lime, is generally preferred in that it is readily available, can be easily mixed with other source materials in aqueous media, and does not introduce any extraneous anions into the product.

Compounds suitable for use as the source material for Na$_2$O include the sodium orthophosphates and condensed phosphates which contain at least one P—O—P linkage such as the metaphosphates and the pyrophosphates and the like, sodium hydroxide, sodium carbonate, and the like. For reasons similar to those stated for the preference for Ca(OH)$_2$ as the CaO source material, sodium hydroxide (NaOH) is preferred as the Na$_2$O source material. Advantages accruing from the use of NaOH as the Na$_2$O source material include its ready availability, its ease of mixing in aqueous media, and little, if any, undesirable foam formation during mixing operations.

Representative source materials for P$_2$O$_5$ include phosphorus pentoxide, orthophosphoric acid, and orthophosphate salts such as sodium dihydrogen orthophosphate, disodium hydrogen orthophosphate, trisodium orthophosphate, condensed phosphoric acids such as pyrophosphoric acids and polyphosphoric acids, and the sodium salts of condensed phosphoric acids. Among these materials, orthophosphoric acid (H$_3$PO$_4$) is preferred, with 85% H$_3$PO$_4$ being most preferred.

The purity of the source materials for CaO, Na$_2$O, and P$_2$O$_5$ must be such that the yield of substantially crystalline calcium sodium metaphosphate is not affected adversely. Advantageously, it is preferred to use reagent grade materials to control the level of undesired impurities such as iron, silica, alumina, and the like.

The substantially crystalline calcium sodium metaphosphate is prepared by bringing together the source materials for CaO, Na$_2$O, and P$_2$O$_5$ in proportions sufficient to provide a CaO/Na$_2$O/P$_2$O$_5$ mol percent ratio on a dry basis of about 29.0–34.0/16.0–18.0/50.0–53.0. The component source materials are mixed by slurrying in aqueous media, usually water. In general, it is preferred to employ sufficient water to provide a wet mix slurry wherein the solid phase concentration (sum of the concentrations of CaO, Na$_2$O, and P$_2$O$_5$) is from about 40% to about 70% by weight, preferably 45% to about 50% by weight. During the mixing operations to prepare the wet mix slurry, the aqueous mixture preferably is maintained at a temperature sufficient to prevent (or suppress) (a) foam formation, (b) excessive water loss, and (c) selective crystallization of sodium dihydrogen phosphate and calcium hydrogen phosphate, either of which could cause an adverse effect upon the CaO/Na$_2$O/P$_2$O$_5$ mol percent ratio and/or the solid phase content of the wet mix slurry. In general, a preferred temperature ranges from about 40° C. to about 95° C.

Following the formation of the CaO/Na$_2$O/P$_2$O$_5$ wet mix slurry, the aqueous liquid phase (water) must be removed and the resulting solid phase calcined to yield the desired (calcined) substantially crystalline calcium sodium metaphosphate (conveniently referred to herein simply as substantially crystalline calcium sodium metaphosphate).

The drying and calcination operations may be effected in any suitable apparatus known to the art. Non-limiting examples include ovens or muffle furnaces containing fixed beds or moving beds, rotary kilns, and the like.

Removal of the aqueous liquid phase of the wet mix slurry can take the form of a simple heating process in which the wet mix slurry is subjected to a temperature that is sufficiently high to volatilize or vaporize the aqueous liquid phase and dry the solid phase.

An alternate drying technique which may be employed is the so-called spray-drying technique. In this technique, the wet mix slurry is sprayed into contact with hot gas, usually air, so as to vaporize the aqueous liquid phase. The drying is controlled by the temperature of the gas and the distance the sprayed or atomized particles travel in contact with the gas. In general, it is desirable to adjust these parameters to avoid too rapid drying as this results in a tendency to form dried skins on the partially dried particles of the solid phase which are subsequently ruptured as water occluded within the particles vaporizes and attempts to escape. At the same time, it is desirable to provide the solid phase particles in a form having as little occluded water as possible. Accordingly, it is advisable to choose the conditions of spray-drying such that substantially complete drying is achieved without particle rupture.

In general, removal of the aqueous liquid phase may be accomplished by heating the wet mix slurry at a temperature from about 90° C. to about 300° C., usually from about 120° C. to about 200° C., for a period of time up to about eight hours, usually from about two hours to about five hours. It will be recognized, however, that the actual time involved will depend upon the temperature employed, the quantity of aqueous liquid (water) present, the quantity of material being dried, and the like. When the spray-drying technique is employed, an inlet air temperature from about 120° C. to about 150° C. and an outlet air temperature from about 90° C. to about 120° C. advantageously is employed. At these temperatures, the resulting solid phase, although somewhat sticky, is sufficiently dry and granular to facilitate subsequent handling.

Following the drying operation, the solid phase is calcined to form the substantially crystalline calcium sodium metaphosphate. The calcination is usually conducted in air at essentially atmospheric pressure [1 atmosphere (atm) $1.013 \times 10^5$ pascals (Pa)] and a temperature in excess of the drying temperature but less than the melting point of substantially crystalline calcium sodium metaphosphate, for example, about 720° C. In general, a temperature from about 350° to about 450°, preferably from about 380° C. to about 420° C., most preferably at about 400° C. is sufficient. The time to complete the calcination can be anything up to about eight hours, but for most purposes, the calcination need take only a nominal period of time up to about four hours.

In a preferred embodiment, the wet mix slurry advantageously is dried and calcined in a one-step operation. Such one-step drying/calcination eliminates the tendency of the solid phase, due to excess acid ($P_2O_5$) content, to form an agglomerated sticky mass (which complicates subsequent handling) when drying operations are carried out at the previously stated drying temperature in a first step separate from the subsequent calcination step. The one-step operation is readily accomplished by spraying the wet mix slurry onto a heated bed of (previously) calcined substantially crystalline calcium sodium metaphosphate maintained at the previously noted preferred temperature from about 380° C. to about 420° C., usually about 400° C., at a rate sufficient to cause substantially instantaneous removal of the aqueous phase, i.e. drying, and calcination of the $CaO/Na_2O/P_2O_5$ wet mix slurry. Such drying/calcination advantageously is carried out in an internally fired rotating calcination apparatus, although any other suitable apparatus known to the art of the type previously noted may be employed, if desired.

The following specific example illustrating the best presently-known method of practicing this invention is described in detail in order to facilitate a clearer understanding of the invention. It should be understood, however, that the detailed expositions of the application of the invention, while indicating preferred embodiments, are given by way of illustration only and are not to be construed as limiting the invention since various changes and modifications within the spirit of the invention will become apparent to those skilled in the art from this detailed description.

EXAMPLE 1

An aqueous solution (35.00 kg) containing 3.41 kg (24.0 moles) of phosphorus pentoxide ($P_2O_5$), 0.41 kg (6.6 moles) of sodium oxide ($Na_2O$), and 0.68 kg (12.1 moles) of calcium oxide (CaO) dissolved in 30.50 kg (1694.4 moles) of water ($H_2O$) was charged to a 100 l stainless steel recirculating slurry tank and the pH adjusted to a value between 10 and 11 by the addition of 0.82 kg (10.2 moles) of 50% by weight aqueous sodium hydroxide (NaOH). To this solution, which was stirred and recirculated, was added 10.67 kg (144.2 moles) of calcium hydroxide [$Ca(OH)_2$] to yield a homogeneous slurry. The slurry was thereafter added, with stirring and recirculation to 52.80 kg (457.9 moles) of 85% aqueous orthophosphoric acid ($H_3PO_4$) contained in a 600 l stainless steel tank fitted with circulating water-cooled coils at a rate sufficient to maintain the temperature between 40° C. and 95° C., followed by the addition of 11.71 kg (146.3 moles) of 50% aqueous NaOH, also at a rate sufficient to maintain the temperature between 40° C. and 95° C. The resulting slurry contained approximately 45% by weight solids and the mol percent of components on a dry basis was 31.6 mol percent CaO, 17.2 mol percent $Na_2O$, and 51.2 mol percent $P_2O_5$.

A 55.88 cm (22 in.) inside diameter $\times$ 48.26 cm (19 in.) long stainless steel tube, including a 12.70 cm (5 in.) long $\times$ 15.24 cm (6 in.) high discharge chute at one end thereof, having its longitudinal axis oriented along a horizontal line and having a centrally located 15.24 cm (6 in.) circular opening in one end and the previously noted 15.24 cm (6 in.) high $\times$ 12.70 cm (5 in.) long discharge chute at the other end and fitted with eight 2.54-cm (1-in.) lifters equally spaced and welded lengthwise to the inside walls, a 45.72-cm (18 in.) long gas-fired, water-cooled line burner containing two parallel rows of six flame nozzles spaced 5.08 cm (2 in.) apart, center-to-center and having a maximum firing rate of $2.53 \times 10^5$ joules/hr. (J/hr, 240 BTU/hr.), a reciprocating spray nozzle, and a motor driven rotation drive was used as the calcination apparatus.

The calcination apparatus was charged with 47.17 kg (104 lb) of (calcined) substantially crystalline calcium sodium metaphosphate, which formed a bed depth of 15.24 cm (6 in.), and heated, while rotating, with the line burner to a temperature of about 400° C. The wet mix slurry from above (110.95 kg, 244.6 lb) was pumped via a metering pump to the reciprocating spray nozzle and sprayed onto the heated bed of substantially crystalline calcium sodium metaphosphate over a 3.7-hr period at a rate sufficient to maintain the bed temperature and produce 53.8 kg/hr-m$^2$ (11.0 lb/hr-ft$^2$) of substantially crystalline calcium sodium metaphosphate. A total of 46.053 kg (101.53 lb) of substantially crystalline calcium sodium metaphosphate was collected. The material was crushed in a jaw crusher to −6 mesh (U.S. Standard Sieve Size, 3.35 mm) and stored in a moisture tight container for subsequent use. The procedure was repeated several times to collect the desired quantity of substantially crystalline calcium sodium metaphosphate.

The degree of crystallinity of the resulting substantially crystalline calcium sodium metaphosphate was calculated as follows:

(a) Density - Equation (1)

$d_{sc} = 2.76$

-continued $$d_{Oc} = 2.59$$
$$d_{100c} = 2.84$$
$$DC = [(2.76 - 2.59)/(2.84 - 2.59)] \times 100$$
$$= (0.17/0.25) \times 100$$
$$= 68.0\%$$

(b) Differential Thermal Analysis (DTA) - Equation (2)

$$pa_c = 63.43$$
$$m_{sc} = 204.39$$
$$pa_{100c} = 98.55$$
$$m_{100c} = 200.08$$
$$DC = [(63.43/204.39)/(98.55/200.08)] \times 100$$
$$= (0.31/0.49) \times 100$$
$$= 63.3\%$$

Thus, it is apparent that there has been provided, in accordance with the instant invention, a process for the preparation of substantially crystalline calcium sodium metaphosphate that fully satisfies the objects and advantages set forth hereinabove. While the invention has been described with respect to various specific examples and embodiments thereof, it is understood that the invention is not limited thereto and that many alternatives, modifications, and variations will be apparent to those skilled in the art in light of the foregoing description. Accordingly, it is intended to embrace all such alternatives, modifications, and variations as fall within the spirit and broad scope of the invention.

What is claimed is:

1. A process for the preparation of substantially crystalline calcium sodium metaphosphate having a degree of crystallinity from about 60% to about 75% as determined from density and differential thermal analysis measurements, which process comprises:

(a) bringing together in aqueous media source materials for CaO, Na$_2$O, and P$_2$O$_5$ in proportion sufficient to provide a CaO/Na$_2$O/P$_2$O$_5$ mol percent ratio on a dry basis of about 29.0–34.0/16.0–18.0/50.0–53.0 and form a wet mix slurry containing a solid phase and an aqueous liquid phase, and (b) heating the wet mix slurry at a temperature and for a time sufficient to remove the aqueous liquid phase and calcine the resulting solid phase to form the substantially crystalline calcium sodium metaphosphate.

2. The process of claim 1 wherein the source material for each of CaO, Na$_2$O, and P$_2$O$_5$, respectively, is calcium hydroxide, sodium hydroxide, and a phosphoric acid.

3. The process of claim 2 wherein the phosphoric acid is 85% H$_3$PO$_4$.

4. The process of claim 1 wherein the CaO/Na$_2$O/P$_2$O$_5$ mol percent ratio is about 31.4–31.8/17.1–17.3/51.1–51.3.

5. The process of claim 1 wherein the solid phase of the wet mix slurry comprises from about 40% to about 70% by weight thereof.

6. The process of claim 1 wherein the wet mix slurry is maintained in step (a) at a temperature from about 40° C. to about 95° C.

7. The process of claim 1 wherein the heating of the wet mix slurry in step (b) is effected at a temperature from about 90° C. to about 720° C.

8. The process of claim 1 wherein the wet mix slurry is heated in step (b) at an initial temperature from about 90° C. to about 300° C. to remove the aqueous liquid phase and dry the solid phase, followed by heating at a subsequent temperature from about 380° C. to about 720° C. to calcine the solid phase.

9. The process of claim 1 wherein the heating of the wet mix slurry in step (b) is effected by spraying the wet mix slurry onto a heated bed of previously calcined substantially crystalline calcium sodium metaphosphate.

10. The process of claim 9 wherein the heating effects drying and calcination of the wet mix slurry in one step.

11. The process of claim 10 wherein the one-step drying/calcination operation is effected at a temperature from about 380° C. to about 420° C.

12. The process of claim 1 wherein the heating of the wet mix slurry in step (b) is carried out for a nominal period of time up to about eight hours.

13. The process of claim 1 wherein the substantially crystalline calcium sodium metaphosphate is characterized by a degree of crystallinity of about 60% to about 70%.

14. The process of claim 13 wherein the degree of crystallinity is between about 63% and about 68%.

* * * * *